Feb. 26, 1946.   W. R. HATHAWAY   2,395,624
APPARATUS FOR REMOVING BURRS FROM TUBES AND THE LIKE
Filed Oct. 25, 1943   3 Sheets-Sheet 2
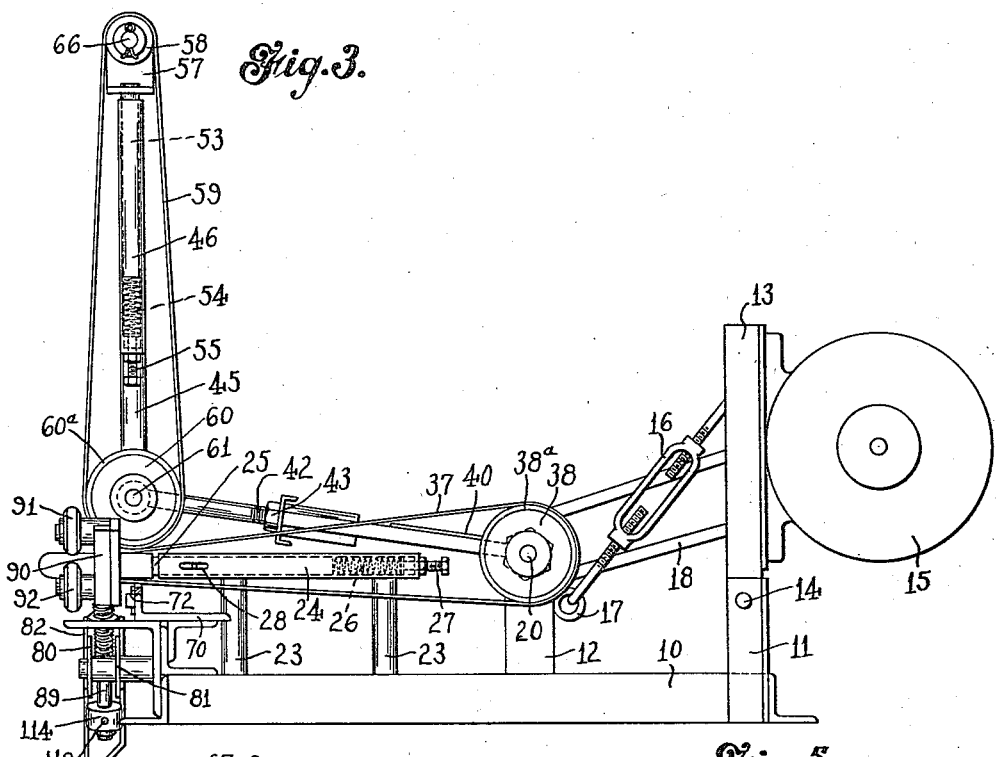
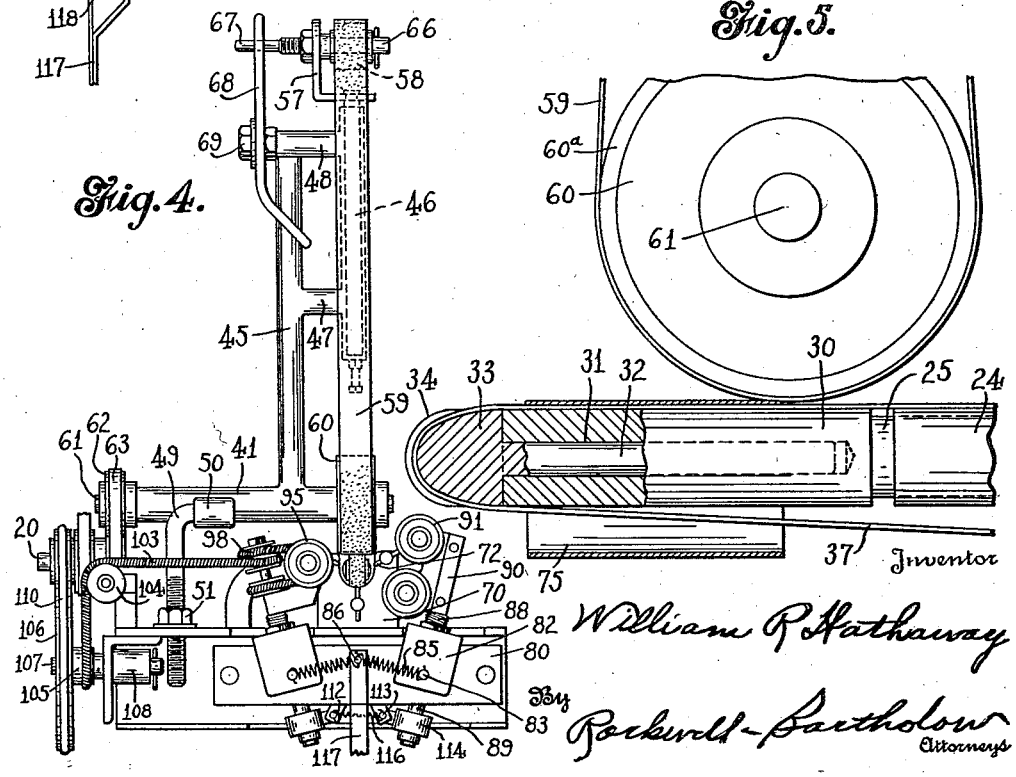

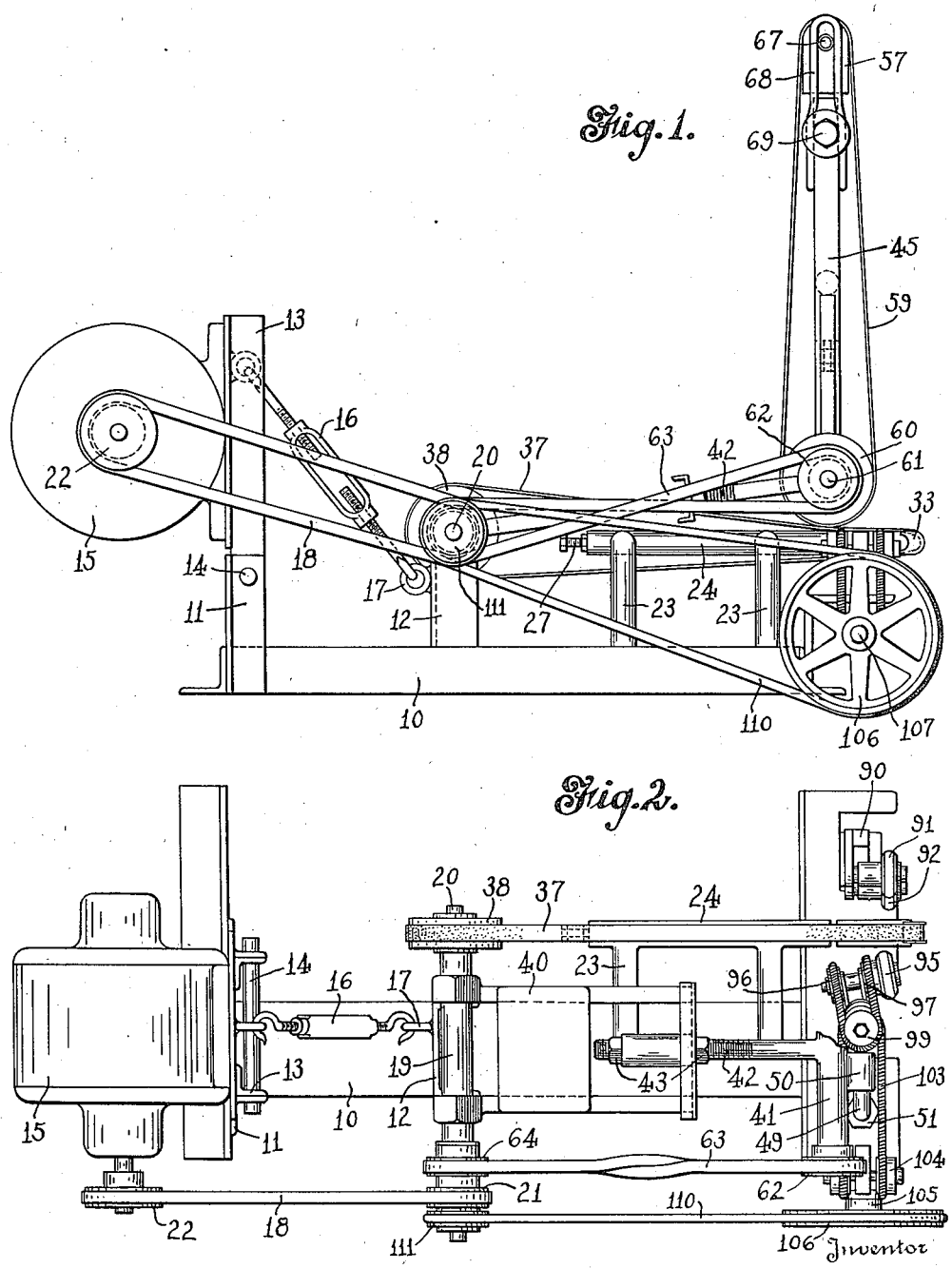

Feb. 26, 1946.  W. R. HATHAWAY  2,395,624
APPARATUS FOR REMOVING BURRS FROM TUBES AND THE LIKE
Filed Oct. 25, 1943  3 Sheets-Sheet 3

Inventor
William R. Hathaway
By Rockwell & Bartholow
Attorneys

Patented Feb. 26, 1946

2,395,624

UNITED STATES PATENT OFFICE 2,395,624

APPARATUS FOR REMOVING BURRS FROM TUBES AND THE LIKE

William R. Hathaway, West Haven, Conn., assignor to United Advertising Corporation, New Haven, Conn., a corporation of New Jersey Application October 25, 1943, Serial No. 507,520

8 Claims. (Cl. 51—140)

This invention relates to a method of and apparatus for removing burrs from lengths of tubing or pipes, and more particularly to an apparatus which will perform this function more speedily and efficiently than has heretofore been possible.

In the manufacture of certain products, it is often necessary to employ tubes, pipes, or ferrules, which are to be telescoped one inside the other. Also, in some instances, it is required that the tubes or pipes be provided with lateral or radially formed openings through the tube walls and, in the boring of these openings also, burrs will be left upon the walls of the tube. If such tubes are to be telescoped, one inside of the other, it is necessary for their surfaces to be smooth, particularly if they fit closely, and it is, therefore, necessary to remove these burrs so that the interior and exterior surfaces of the tubes will be smooth.

While I have referred particularly to tubes, ferrules, or lengths of pipe which are to be telescoped, one within the other, it will, of course, be understood that in other instances as well it is necessary or desirable to remove the burrs from such elements, and it is understood that my device will be useful for this purpose regardless of the intended use of the tube itself.

Briefly speaking, the apparatus employed consists in the provision of a pair of cooperating abrasive members such as abrasive belts which are arranged at an angle to each other and which are brought into close proximity or substantial contact at one point so as to form a "bite" into which the end of the tube may be fed. At this point, the belts are operated in the same direction and at the same speed. The point of contact between the belts is intermediate the ends of one of the belts so as to leave an end of the latter projecting beyond the point of contact, and the projecting end of this belt is so arranged that a tube may be readily slipped over this end so as to bring its burred end or edge into the bite. Thus, one of the belts operates within the tube so that it not only removes the burr at the end of the tube but also any burr which may be found upon the lateral openings through the walls of the tube. Simultaneously, the other belt will operate upon the exterior of the tube at the end thereof presented to the bite, so that the burrs will be removed from the inside and the outside of the tube at the same time, the tube being rotated to present all portions of the end edge to the belts.

One object of the invention is to provide a new method of and apparatus for removing burrs or the like from tubes, pipes, or ferrules.

A still further object of the invention is to provide an apparatus for removing the burrs from tubes or the like which will operate much more efficiently than prior devices employed for this purpose.

Still another object of the invention is to provide an apparatus for the purpose described, comprising a pair of abrasive members such as traveling abrasive belts which will be disposed in angular relation one to the other and which will have certain portions of their surfaces brought into close proximity to form a bite to which the end of the tube may be fed.

A still further object of the invention is to provide an apparatus of the type above described in which those portions of the belts which are in close proximity or substantial contact will be operated in the same direction and at the same speed, so that the abrasive upon one belt will not be worn off by the other.

A still further object of the invention is to provide an apparatus of the character described, which will include means for rotating the work so as to present all parts of the end surface thereof to the abrasive members and thus relieve the workman of this operation.

To these and other ends, the invention relates to the novel features and combinations of parts to be hereinafter described and claimed.

In the accompanying drawings:

Fig. 1 is a side elevational view of an apparatus for removing burrs from tubes or the like, embodying my invention;

Fig. 2 is a top plan view of the apparatus with some parts broken away for the sake of clearness;

Fig. 3 is a view similar to Fig. 1 of the opposite side of the apparatus;

Fig. 4 is a front elevational view of the apparatus;

Fig. 5 is an enlarged, fragmentary side elevational view showing the operation of the cooperating abrasive members;

Figure 6:
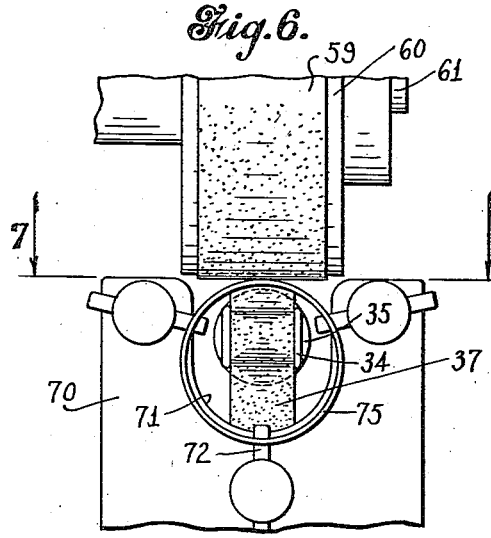
Fig. 6 is a front view of the parts shown in Fig. 5.

To illustrate a preferred embodiment of my invention, I have shown in Fig. 1 of the drawings a frame comprising a base or bed 10 from which are supported upright spaced standards 11 and 12.

A motor support 13 is pivoted at 14 to the standard 11 and carries an electric motor 15 which serves to drive the machine although it will be understood that any form of drive may be employed, as desired. The support 13 is adjustably held in place by means of the turnbuckle structure 16 secured at one end to the motor support 13 and at the other end to an eye 17 on the standard 12. This, as will be obvious, serves to maintain the drive belt 18 at the proper tension.

Supported at the upper end of the standard 12 is a tubular bearing 19, in which is rotatably mounted a shaft 20, this shaft carrying a pulley 21 about which is trained the belt 18 leading from the pulley 22 driven by the motor.

Supported from the bed 10 by a pair of L-shaped standards 23 is a tubular member 24 which, as shown, is substantially horizontally disposed. Within this tubular member is slidably mounted a plunger 25 urged forwardly by a spring 26, the tension of which may be adjusted by the adjusting screw 27 at the rear end of the tube 24. The plunger 25 has a pin-and-slot connection with the tube at 28 so as to limit its movement relatively to the tube under the urge of the spring.

As shown more particularly in Figs. 3 and 5, the plunger 25 projects from the tube at its forward end and is provided with a head portion 30 having an opening 31 therein, within which is slidably received the stem 32 of a belt shoe 33. This belt shoe may be of hardened steel and is provided with lateral forwardly directed guide flanges 34 between which one of the abrasive belts is disposed, as will be hereinafter described, these flanges preventing lateral displacement of the belt. The shoe 33 may be prevented from rotating with respect to the head 30 in any desired way. As shown, the head is provided with lateral flanges 35 which project forwardly at each side of the shoe, which will prevent rotation of the latter. Also, as shown, the forward end of the shoe 33 is rounded so as to provide easy travel for the bight portion of the belt.

An abrasive belt 37 is trained about the shoe 33 at one end and at the other end about a pulley 38 secured on the shaft 20 which, as previously explained, is driven from the motor so that the belt 37 will be maintained in continuous travel as long as the motor is in operation. It will be seen that, as the plunger 25 is urged forwardly by the spring 26, the latter will maintain the belt 37 under tension, which tension may be adjusted by the screw 27. When desired to remove and replace belt 37, it is only necessary to push inwardly on the head portion 30 against the pressure of the spring 26, which will enable the belt to be removed over one or the other of the flanges 34. When the belt is replaced, removal of the pressure upon the head will immediately permit the latter to be urged forwardly by the spring and again place the belt under the proper tension.

Pivotally carried upon the shaft 20 is a forwardly extending frame 40 to which is adjustably secured a tubular bearing member 41 by means of a threaded stem 42 which projects rearwardly from the bearing member 41 and is secured to the member 40 by adjusting nuts 43. Extending upwardly from the tubular bearing member 41 is an upright standard 45 from which is supported a tubular member 46 by horizontal arms 47 and 48, thus providing a frame which supports the second abrasive belt which cooperates with the belt 37 previously described.

The forward end of this frame may be supported by means of an L-shaped rod 49 attached at 50 to the tubular bearing 41 and provided with a threaded lower end which loosely enters an opening in the base 10 and receives thereupon an adjusting nut 51 which bears against the base and thus supports the belt frame.

Within the tube 46, as shown more particularly in Fig. 3, is slidably mounted a plunger 53 urged upwardly by a spring 54, the tension of which may be varied by adjusting screw 55, and this plunger is provided, upon its upper end which projects from the tube 46, with a yoke 57 rotatably supporting a pulley 58. About the pulley 58 is trained a second abrasive belt 59, the other end or bight portion of which is passed about a pulley 60 secured to a shaft 61 rotatably mounted in the tubular bearing member 41 and provided at its other end with a pulley 62. A driving belt 63 is trained about the pulley 62 and also about a pulley 64 secured to the shaft 20. As the shaft 20 is driven from the motor by the belt 18, it will be obvious that the belt 63 will likewise serve to drive the shaft 61 and thus rotate the pulley 60 to drive the abrasive belt 59.

The pulley 58 is rotatably mounted on a shaft 66 supported by the yoke 57. One end of this shaft is extended as shown at 67 and extends between the arms of a U-shaped stop member 68 secured at 69 to the standard 45. This engagement of the end of shaft 66 with the stop member 68 prevents turning of the plunger 53 within the tubular support 46, although any other convenient means may be employed for this purpose, if desired.

As will be seen from Figs. 3 and 5, for example, the belts 59 and 37 are in substantial contact below the pulley 60, and the belt 37 projects a substantial distance forwardly of this point, the point of contact of the belts presenting a bite to which the work is fed, as will be hereinafter explained. The projecting end of the plunger 25, carrying the belt 37, is of such dimensions that the tube may be slipped over the plunger and over the belt 37, both runs or reaches of which will operate within the tubular workpiece. Preferably, the pulleys 60 and 38 will be provided with surface portions of compressible friction material such as rubber for example, as shown at 60a and 38a. This will provide for the effective gripping and driving of the abrasive belts and will also, at the point of contact between belts 59 and 37, provide for some resiliency when the workpiece is brought into the bite of the two belts. It will also be understood that the abrasive belts are so driven that their surfaces adjacent the point of contact will travel in the same direction and also at the same speed. This direction is counter-clockwise with respect to the pulley 60, as shown in Fig. 5, and to the right with respect to the upper run of the belt 37, as shown in this figure, so that the travel of the belts will tend to draw the work into the bite.

Figure 7:
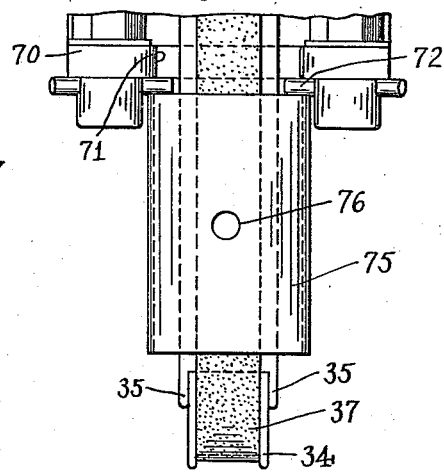
Fig. 7 is a top plan view of the forward end of the lower belt on line 7—7 of Fig. 6.

Projecting upwardly from the base 10 is a standard 70 having a slot 71 at its upper end through which the head 30 of the plunger projects. Mounted upon this standard are a plurality of stop members 72 consisting of pinlike elements projecting into the slot 71 and designed as shown in Fig. 7 to contact the inner end of the workpiece and thus limit the entrance of the workpiece into the bite of the abrasive belts.

The operation of the device, as thus far described, is as follows.

The workpiece, in the form of a tubular member 75, is slipped over the head 30 of plunger 25 and also, of course, over the forwardly projecting end of the belt 37 as shown in Fig. 5. The workpiece, as shown, is a relatively short length of tube or pipe which has been cut from a length of stock of suitable diameter, and will thus not only have burrs upon its end portions but is provided with one or more lateral openings 76 at which points burrs will also be present. It is thus necessary not only to remove the burrs from the inside and outside of the end portions of the workpiece but also to remove the burrs from about the lateral openings 76.

With the abrasive belts in motion, the workpiece 70 will be slipped into place and will be drawn into the bite between the belts as far as permitted by the stops 72, by the action of the belts themselves. The belts then cooperate simultaneously to remove the burrs from the end of the workpiece presented to them at both the inside and outside; thus, by rotating the workpiece upon the cylindrical head 30, the entire inner and outer peripheries of one end of the workpiece may be presented to the abrasive belts and the inside and outside burrs simultaneously removed. Also, at the same time, the inside of the tube is smoothed by the upper run of the belt 37 so that any burr which may exist at the inner end of the lateral opening or openings 76 will be removed. If necessary, the operator may exert slight downward pressure upon the element 75 for this purpose. It is then only necessary to turn the workpiece 75, end for end, and repeat the operation upon the other end of the tube, the entire operation requiring a few seconds. If there is any burr upon the outside of the tube, at the lateral opening 76, this portion of the tube may be held against the forward run of the vertically disposed belt 59 and such burr thereby removed, so that the tube is completely smooth on both its inner and outer surfaces, and all burrs removed.

In some instances, it has been found that the operation of turning the tubular elements on the head 30 is fatiguing and I have, therefore, provided an apparatus which will perform this operation and which may be employed, if desired, although it will be understood that the turning operation may also be satisfactorily performed by hand. Supported at the front of the bed are a pair of plates 80 and 81, upon which are mounted inverted U-shaped supports 82, these supports having pins 83 extending therethrough which also extend through slots 84 in the plates 80 and 81 so that the supports 82 are allowed a limited movement relatively to the plates. Springs 85 connect the pins 83 to a pin 86, slidably mounted in vertical slots 87 in plates 80 and 81, which springs normally urge the supporting members 82 toward each other, or inwardly.

Figure 8:
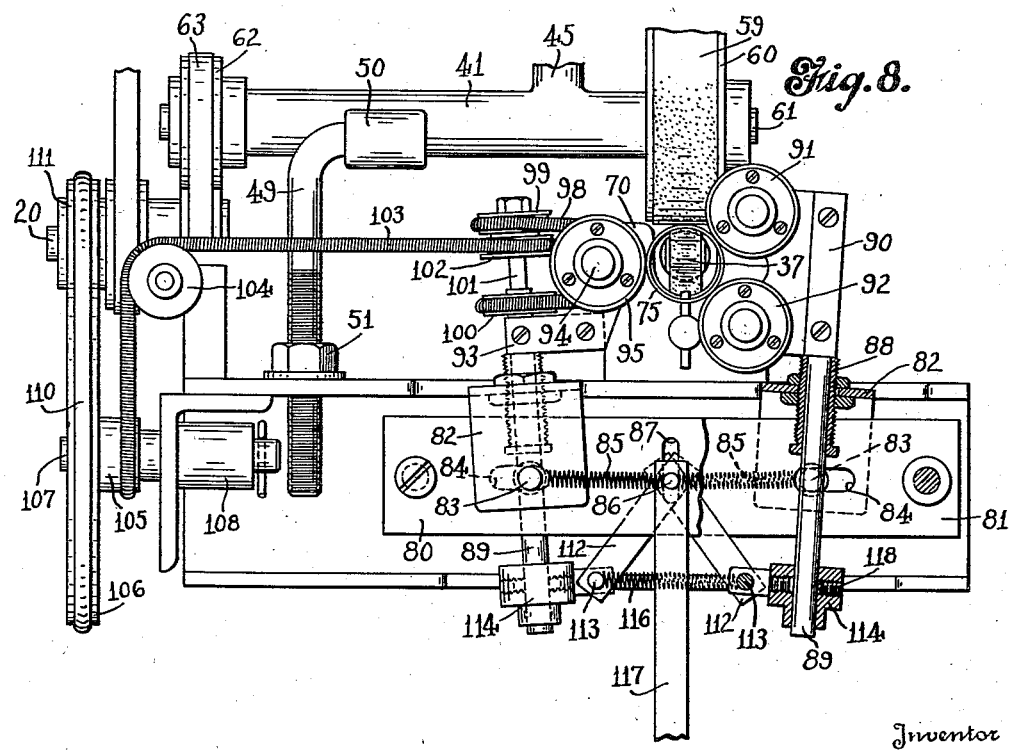
Fig. 8 is an enlarged front view of the lower portion of the apparatus with the feeding mechanism in a different position from that shown in Fig. 4.

Each of the supports 82 carries a vertical adjustable sleeve 88 in which is slidably mounted a rod 89. Upon the upper end of one of the rods 89 (the righthand one shown as in Fig. 8) is mounted a block 90 carrying a pair of cooperating rollers 91 and 92 serving to contact the workpiece 75, these rollers being provided with friction surfaces such as leather or the like to grip the workpiece.

Upon the upper end of the lefthand rod 89 is mounted a block 93 rotatably carrying a shaft 94 having a roller 95 thereon, similar to and cooperating with the rollers 91 and 92, to engage and rotate the workpiece. Also, upon the shaft 94, as shown in Fig. 2, are a pair of pulleys 96 and 97, around which is trained a spring belt 98, this belt being also trained around pulleys 99 and 100 rotatably mounted on a shaft 101 carried by the rod 89. The shaft 101 likewise carries a pulley 102 secured to pulley 99, and about the pulley 102 is trained a spring belt 103 which passes about guide pulleys 104 and also about the hub 105 of a pulley 106 secured upon a shaft 107 rotatably mounted in a bearing 108 secured to the bed of the machine. The pulley 106 is driven by a belt 110 from a pulley 111 on the main driving shaft 20.

Referring to the pin 86, slidably mounted in the slots 87 in the plates 80 and 81, a pair of links 112 are pivoted to this pin at their upper ends and the lower end of each of these links is pivoted at 113 to a collar 114 carried at the lower ends of the rods 89. Springs 116 extend between the pivot pins 113, thus serving to draw the lower ends of the rods 89 together. An operating bar 117 is also secured to the pin 86 and depends therefrom. It is also to be noted that the rods 89 are angularly or rotatively adjustable in the collars 114 and are held in place by set screws 118 so that, by loosening the screws and adjusting these rods, the angular relation of the rollers 91, 92, and 95 may be changed with relation to the workpiece 75 so that, if desired, these rollers may be set to feed the workpiece toward the bite of the abrasive belts.

It will be apparent that the springs 116 normally maintain the feed rolls 91, 92, and 95 in their open position as shown in Fig. 4, as these springs tend to draw the lower ends of the links 112 together and thus rotate the supporting members 82 about the pins 83 to draw the rollers away from the work. This action of the springs 116 also maintains the pin 86 at the upper end of the slot 87. After the operator has placed the workpiece 75 in position upon the belt carrying head 30, he may draw downwardly on the bar 117, thus serving to spread the lower ends of the links 112 and move the lower ends of the rods 89 outwardly, thus forcing the feed rollers 91, 92, and 95 against the work. The pressure of the feed rollers on the work is then controlled by the springs 85 which will permit outward movements of the pivot pins 83 as limited by the slots 84 in the plates 80 and 81.

As the feed roller 95 is positively rotated from the main driving shaft 20, as previously described, the work 75 will be rotated upon the head 30 and thus the workman will be relieved of this operation. When one end of the tube has been treated, the operating bar 117 is released and the feed rollers returned to the position shown in Fig. 4 so that the workpiece may be removed and turned end for end without stopping the machine.

While I have shown and described a preferred embodiment of my invention, it will be understood that it is not to be limited to all of the details shown but is capable of modification and variation within the spirit of the invention and within the scope of the appended claims.

What I claim is:

1. A device for removing burrs from tubular elements comprising an endless abrasive belt member having a projecting end portion over which an element may be telescoped, a second endless abrasive belt member having a portion in substantial contact with an intermediate portion of said first-named belt to form a bite therebetween and to contact the exterior of an element telescoped over the projecting end of the first member, and means for supporting and driving said belt members.

2. A device for removing burrs from tubular elements comprising an endless abrasive belt member having a projecting end portion over which an element may be telescoped, a second endless abrasive belt member having a portion in substantial contact with an intermediate portion of said first-named belt to form a bite therebetween and to contact the exterior of an element telescoped over the projecting end of the first member, and means for supporting and driving said belt members in the same direction at their adjacent surfaces.

3. A device for removing burrs from tubular elements comprising a pair of cooperating abrasive endless belts, means for supporting said belts, one of said belts having a freely projecting looped end portion adapted to be received in one of said elements to permit the latter to be telescoped over the looped end of the belt, and the other of said belts having a bight portion in substantial contact with a portion of said first belt at a point spaced from said looped end.

4. A device for removing burrs from tubular elements comprising a pair of cooperating endless abrasive belts, means for supporting said belts, one of said belts having a bight portion disposed in substantial contact with a reach of the other belt and said other belt having a looped end portion projecting freely beyond said point of substantial contact to extend into the interior of one of said elements whereby the end edge of the latter is brought into the bite between said belts, and means for driving the adjacent portions of said belts in the same direction and at substantially the same speed.

5. A device for removing burrs from tubular elements comprising an endless abrasive belt member, means about which the ends of said member are trained for travel there-around, supports for said means, one of said means projecting from its support to provide a free end over which the work may be telescoped, a second endless abrasive belt member, means for supporting said last-named member with a bight portion thereof in substantial contact with a portion of said first belt to receive the edge of the work in the bite between said belts, and means for driving said belts.

6. A device for removing burrs from tubular elements comprising an endless abrasive belt member, means about which the ends of said member are trained for travel thereon and for supporting the belt in taut condition, supports for said means, one of said means projecting from its support to provide a free end over which the work may be telescoped, a second endless abrasive belt member, means for supporting said last-named member with a bight portion thereof in substantial contact with a portion of said first belt spaced from said free end to receive the edge of the work in the bite between said belts, and means for driving said belts at substantially the same speed.

7. A device for removing burrs from tubular elements comprising a pair of endless abrasive belts, means about which one of said belts is trained, said means being arranged to position the bight portion of said belt in substantial contact with a reach of the other belt between the ends of the latter to form a bite between the adjacent surfaces of the two belts, and means to support said other belt with a looped end thereof projecting freely beyond said bite whereby the work may be telescoped over said end and its edge received in said bite.

8. A device for removing burrs from tubular elements comprising a pair of endless abrasive belts, means about which one of said belts is trained, said means being arranged to position the bight portion of said belt in substantial contact with a reach of the other belt between the ends of the latter to form a bite between the adjacent surfaces of the two belts, means to support said other belt with a looped end thereof projecting freely beyond said bite whereby the work may be telescoped over said end and its edge received in said bite, and means to rotate said element and urge it into the bite between said belts.

WILLIAM R. HATHAWAY.